United States Patent
Li et al.

(10) Patent No.: US 8,233,118 B2
(45) Date of Patent: Jul. 31, 2012

(54) LIQUID CRYSTAL DISPLAY WITH A BACKLIGHT SOURCE COMPRISING FIRST LIGHT SOURCE COMPONENTS AND SECOND LIGHT SOURCE COMPONENTS DIFFERENT FROM THE FIRST LIGHT SOURCE COMPONENTS

(75) Inventors: Yueh-Han Li, Taichung (TW); Po-Tang Hsu, Taipei (TW); Chih-Fu Hsu, Taipei (TW); Chien-Ming Ko, Taipei (TW); Chun-Liang Lin, Hsinchu (TW)

(73) Assignee: AU Optronics Corporation (TW)

( * ) Notice: Subject to any disclaimer, the term of this patent is extended or adjusted under 35 U.S.C. 154(b) by 881 days.

(21) Appl. No.: 12/228,526

(22) Filed: Aug. 12, 2008

(65) Prior Publication Data

US 2010/0039587 A1    Feb. 18, 2010

(51) Int. Cl.
*G02F 1/1335* (2006.01)
*G02F 1/1343* (2006.01)
(52) U.S. Cl. .................... 349/106; 349/142; 349/143
(58) Field of Classification Search .......... 349/106–109, 349/139, 143, 142
See application file for complete search history.

(56) References Cited

U.S. PATENT DOCUMENTS

| 5,617,229 | A  | * | 4/1997 | Yamamoto et al. | 349/42 |
| 7,286,193 | B2 |   | 10/2007 | Yoo et al. | 349/62 |
| 2002/0071070 | A1 | * | 6/2002 | Yano et al. | 349/98 |
| 2007/0139352 | A1 | * | 6/2007 | Pugh et al. | 345/102 |

FOREIGN PATENT DOCUMENTS

| WO | 2007/072353 | 6/2007 |
| WO | WO2008/100493 A1 | 8/2008 |

* cited by examiner

*Primary Examiner* — Mark Robinson
*Assistant Examiner* — Paul Lee

(57) ABSTRACT

A color liquid-crystal display panel has a red filter segment in each red sub-pixel and a blue filter segment in each blue sub-pixel, but no green filter segment in green sub-pixels. The liquid-crystal display panel has a backlight source for illuminating, and the backlight source has green light producing components alternately switched on and off in consecutive frames. The backlight source also has white or red/blue, or purple light emitting components alternately switched on and off in consecutive frames in complementary phase to the green light producing components. When the liquid crystal layer segments associated with all the three color sub-pixels are operated in a light non-blocking state, only the white or red/blue light producing components are turned on, and when the liquid crystal layer segments associated with the red sub-pixels are operated in a light blocking state, only the green light producing components are turned on.

26 Claims, 8 Drawing Sheets

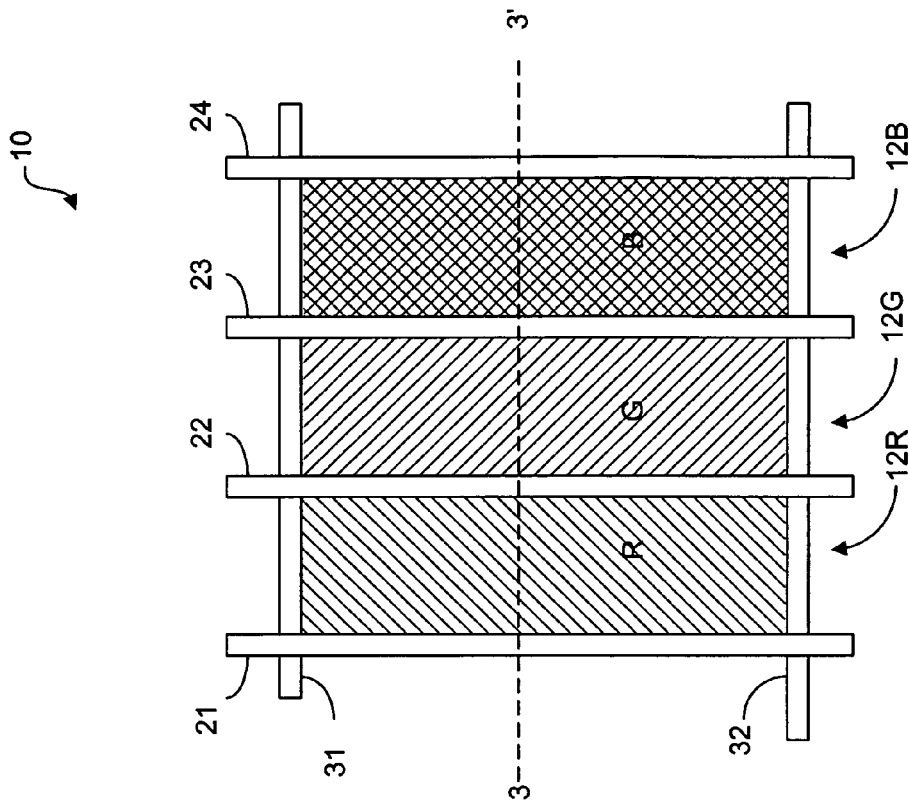
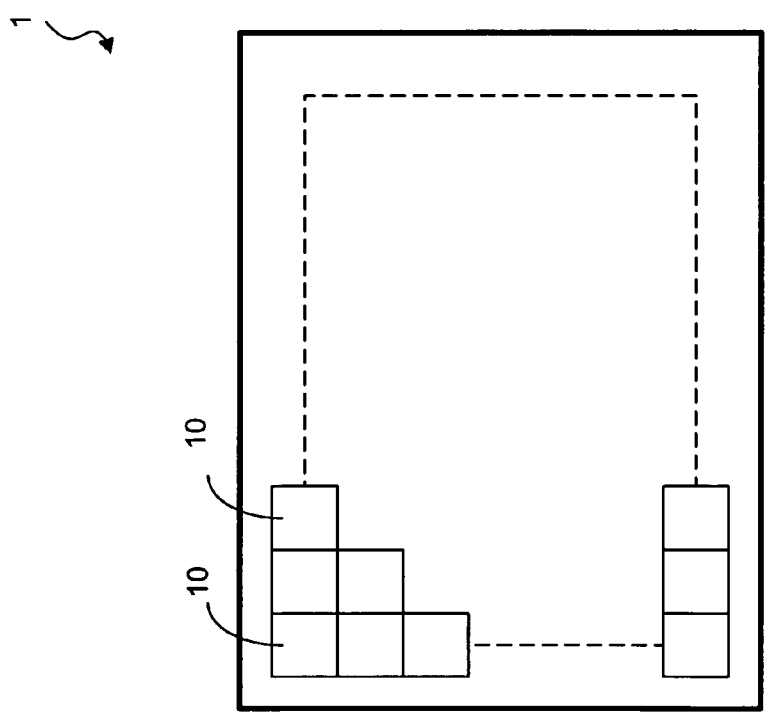
FIG. 2 (prior art)
FIG. 1 (prior art)

US 8,233,118 B2

LIQUID CRYSTAL DISPLAY WITH A BACKLIGHT SOURCE COMPRISING FIRST LIGHT SOURCE COMPONENTS AND SECOND LIGHT SOURCE COMPONENTS DIFFERENT FROM THE FIRST LIGHT SOURCE COMPONENTS

FIELD OF THE INVENTION

The present invention relates generally to a liquid crystal display panel with a backlight unit and, more particularly, to the control of color sub-pixels in the liquid crystal display panel in coordination of the backlight source.

BACKGROUND OF THE INVENTION

As known in the art, a color LCD panel 1 has a two-dimensional array of pixels 10, as shown in FIG. 1. Each of the pixels comprises a plurality of sub-pixels, usually in three primary colors of red (R), green (G) and blue (B). These RGB color components can be achieved by using respective color filters. FIG. 2 illustrates a plan view of the pixel structure in a conventional liquid crystal panel, and FIG. 3 is a cross sectional view of the pixel structure. As shown in FIG. 2, a pixel can be divided into three color sub-pixels 12R, 12G and 12B. In a transflective color LCD panel, each sub-pixel can be divided into a transmissive area and a reflective area (not shown). In general, the color sub-pixel 12R is controlled by a gate line 31 and a data line 21, the color sub-pixel 12G is controlled by the gate line 31 and a data line 22, the color sub-pixel 12B is controlled by the gate line 31 and a data line 23. The gate line 32 is used to control the pixels in the next pixel row and the data line 24 is used to control the color sub-pixel 12R in the next pixel column, for example.

FIG. 3 shows a typical color pixel in a transmissive LCD panel or the transmissive area in a transflective LCD. As shown in FIG. 3, a typical LCD panel 10 has many layers: an upper substrate 52 having a polarizer 42, a color filter 110 and a common electrode layer 60; a lower substrate 50 having a polarizer 40, a device layer 70, a passive layer 80 and a lower electrode layer 60. The device layer 70 typically has a plurality of switching elements such as thin-film transistors for controlling the color sub-pixels, and a plurality of capacitors for charge storage purposes. The lower electrode layer 60 comprises a first sub-pixel electrode 62, a second sub-pixel electrode 64 and a third sub-pixel electrode 66. The first sub-pixel electrode 62, electrically connected to the control elements in the device layer 70 by a via 72, is associated with the color sub-pixel 12R. The second sub-pixel electrode 64, electrically connected to the control elements in the device layer 70 by a via 74, is associated with the color sub-pixel 12G. The third sub-pixel electrode 66, electrically connected to the control elements in the device layer 70 by a via 76, is associated with the color sub-pixel 12B. A liquid crystal layer 90 is disposed between the upper substrate and the lower substrate. A backlight source 150 located on the backside of the LCD panel is used to provide illumination.

As known in the art, the liquid crystal molecules in the liquid crystal layer can be caused to change its bulk structure by the voltage potential across the layer. Depending on the type or the characteristics of a liquid crystal layer, the liquid crystal molecules can be caused to align along a certain direction by the voltage potential between the common electrode 60 and the sub-pixel electrode. When the voltage potential is removed or the voltage on the sub-pixel electrode is turned off, the liquid crystal molecules can become randomly oriented. For simplicity, it is suffice to state that the liquid crystal layer associated with a sub-pixel can be in a light-blocking state or in a light non-blocking state. As shown in FIG. 3, the liquid crystal molecules are aligned along an axis that is perpendicular to the substrates 50 and 52. As such, the liquid crystal layer in all three color sub-pixels 12R, 12G and 12B is in a light non-blocking state. The light beam from the backlight source 150 can sufficiently pass through the liquid crystal layer 90 and the color filter 110 to reach a viewer's eyes. If the light beam from the backlight source 150 is white and containing three primary color components of R, G and B, the light component passed through the red color filter R in the sub-pixel 12R is red, the light component passed through the green color filter G in the sub-pixel 12G is green, and the light component passed through the blue color filter B in the sub-pixel 12B is blue.

As the light beam passes through the color filter 110, a substantial part of the light beam is absorbed in the color filter 110. It is thus desirable to provide a liquid crystal display panel wherein the absorption of the backlight beam can be reduced.

SUMMARY OF THE INVENTION

The present invention provides a color liquid-crystal display panel comprising a plurality of pixels, at least some of the pixels comprising color sub-pixels, wherein the color sub-pixels comprise red sub-pixels, green sub-pixels and blue sub-pixels. While the color filter layer in a pixel has a red filter segment in the red sub-pixel and a blue filter segment in the blue sub-pixel, there is no green filter segment in the green sub-pixel. The backlight source for illuminating the color crystal display panel has a plurality of green light producing components alternately switched on and off in consecutive frames. The backlight source also has a plurality of white light producing components, according to one embodiment, or a plurality of red/blue light producing components, according to another embodiment. The white or red/blue light producing components are alternately switched on and off in consecutive frames in a complementary phase as compared to the switching cycle of the green light producing components. When the liquid crystal layer segments associated with all the three color sub-pixels are operated in a light non-blocking state (a first state), the white or red/blue light producing components are turned on, and the green light producing components are turned off. When the liquid crystal layer segments associated with the red sub-pixels are operated in a light blocking state (a second state), the green light producing components are turned on, and the white or red/blue light producing components are turned off. Thus, the liquid crystal layer segments associated with the green and blue color sub-pixels are operated in the first state in all frames, but the liquid crystal layer segments associated with red sub-pixels are alternately operated in the first state and in the second state.

Thus, the first aspect of the present invention is a liquid crystal display, which comprises a plurality of pixels, at least some of the pixels comprising color sub-pixels, the color sub-pixels comprising first sub-pixels, second sub-pixels and third sub-pixels. The liquid-crystal display further comprises:

a color filter comprising a red filter segment configured for color filtering in each first sub-pixel, and a blue filter segment configured for color filtering in each third sub-pixel;

a liquid crystal layer comprising a plurality of liquid crystal layer segments associated with the color sub-pixels, each liquid crystal layer segment operable in a first state and in a second state; and a backlight source for illuminating the liquid-crystal display through the liquid crystal layer and the color filter, said backlight source comprising a plurality of first light source components and a plurality of second light source components different from the first light source components, such that when the liquid crystal layer segments associated with the first sub-pixels, the second sub-pixels and the third sub-pixels are operated in the first state, the first light source components are turned on for said illuminating; and when the liquid crystal layer segments associated with the second sub-pixels and the third sub-pixels are operated in the first state, and the liquid crystal layer segments associated with the first sub-pixels are operated in the second state, the second light source components are turned on for said illuminating.

The second aspect of the present invention is a method for operating a liquid crystal display panel, wherein the liquid crystal display panel comprises:

a liquid crystal layer,
a color filter, and
a plurality of pixels, at least some of the pixels comprising color sub-pixels, wherein the color sub-pixels comprise first sub-pixels, second sub-pixels and third sub-pixels, and wherein the liquid layer comprises a plurality of liquid crystal layer segments associated with the color sub-pixels, each liquid crystal layer segment operable in a first state and in a second state, and wherein the backlight source is arranged for illuminating the liquid-crystal display through the liquid crystal layer and the color filter, the backlight source comprising a plurality of first light source components and a plurality of second light source components different from the first light source components. The method comprises:

arranging in the color filter a red filter segment for color filtering each first sub-pixel and a blue filter for color filtering each third sub-pixel;

operating the backlight source such that when the liquid crystal layer segments associated with the first sub-pixels, the second sub-pixels and the third sub-pixels are operated in the first state, the first light source components are turned on for said illuminating; and when the liquid crystal layer segments associated with the second sub-pixels and the third sub-pixels are operated in the first state, and the liquid crystal layer segments associated with the first sub-pixels are operated in the second state, the second light source components are turned on for said illuminating.

The third aspect of the present invention is a backlight source, which can be used for illuminating a color liquid-crystal display, wherein the liquid crystal display panel comprises:

a liquid crystal layer,
a color filter, and
a plurality of pixels, at least some of the pixels comprising color sub-pixels, wherein the color sub-pixels comprise first sub-pixels, second sub-pixels and third sub-pixels, and wherein the liquid crystal layer comprises a plurality of liquid crystal layer segments associated with the color sub-pixels, each liquid crystal layer segment operable in a first state and in a second state, and wherein the color filter comprising a red filter segment configured for color filtering in each first sub-pixel, and a blue filter segment configured for color filtering in each third sub-pixel. The backlight source comprises:

a plurality of first light source components; and
a plurality of second light source components different from the first light source components, wherein the first light source components are configured to be turned on for said illuminating only when the liquid crystal layer segments associated with the first sub-pixels, the second sub-pixels and the third sub-pixels are operated in the first state, and the second light source components are configured to be turned on for said illuminating only when the liquid crystal layer segments associated with the second sub-pixels and the third sub-pixels are operated in the first state, and the liquid crystal layer segments associated with the first sub-pixels are operated in the second state.

According to one embodiment of the present invention, the first light source components comprise white light emitting components, and the second light source components comprise green emitting components.

According to another embodiment of the present invention, the first light source components comprise red light emitting components and blue light emitting components, and the second light source components comprise green light emitting components.

According to yet another embodiment of the present invention, the first light source components comprise purple light emitting components, and the second light source components comprise green light emitting components. The purple light emitting components comprise blue light emitting diodes (LEDs) and red producing fluorescent materials excitable by the light from the blue LEDs.

The present invention will become apparent upon reading the description taken in conjunction with FIGS. 4a to 7.

BRIEF DESCRIPTION OF THE DRAWINGS

FIG. 1 shows a typical liquid crystal display panel.
FIG. 2 shows a typical color pixel having three color sub-pixels.

DETAILED DESCRIPTION OF THE INVENTION

Figure 3:
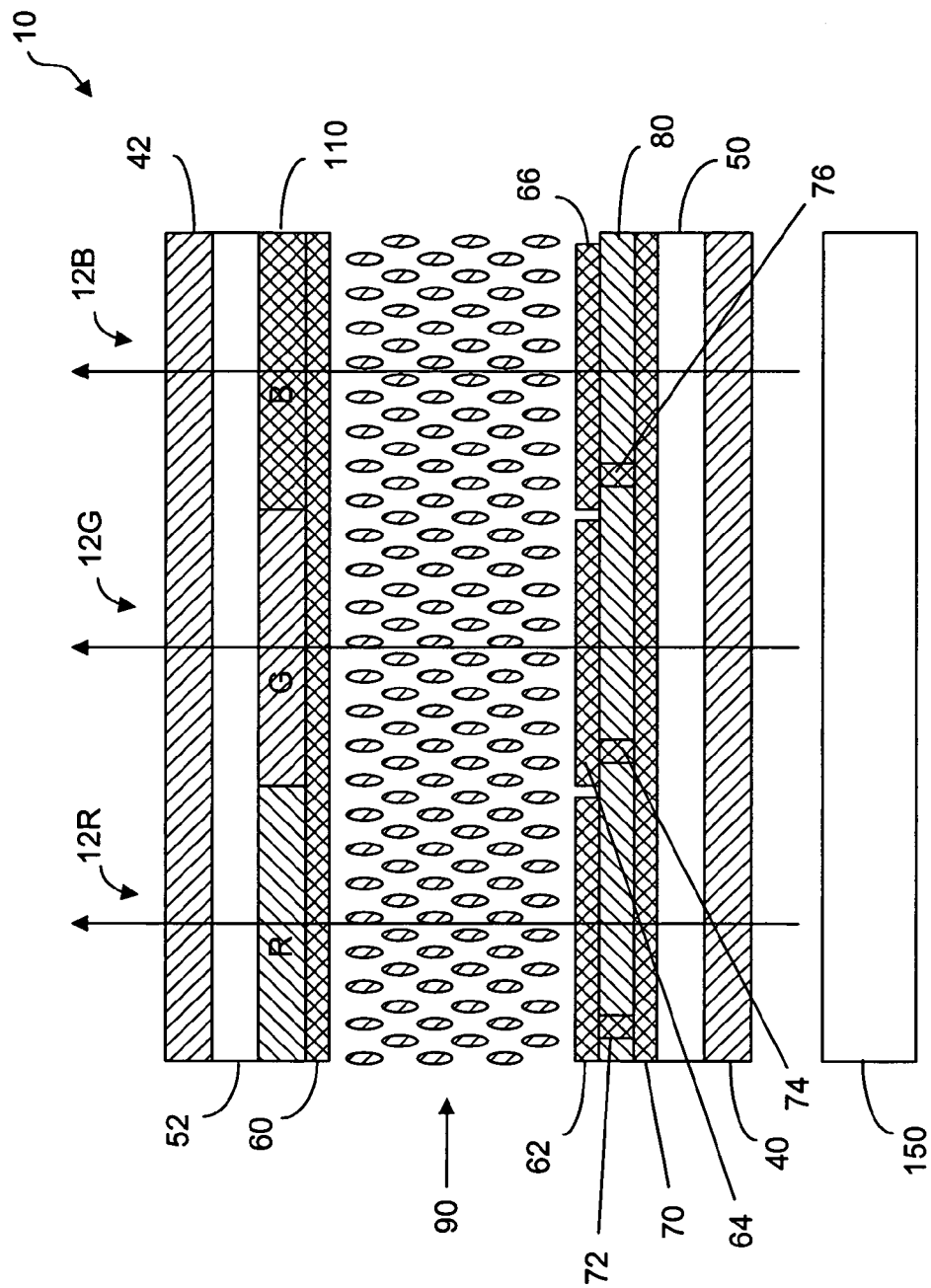
FIG. 3 shows a typical layer structure of color pixel.
Figure 4A:
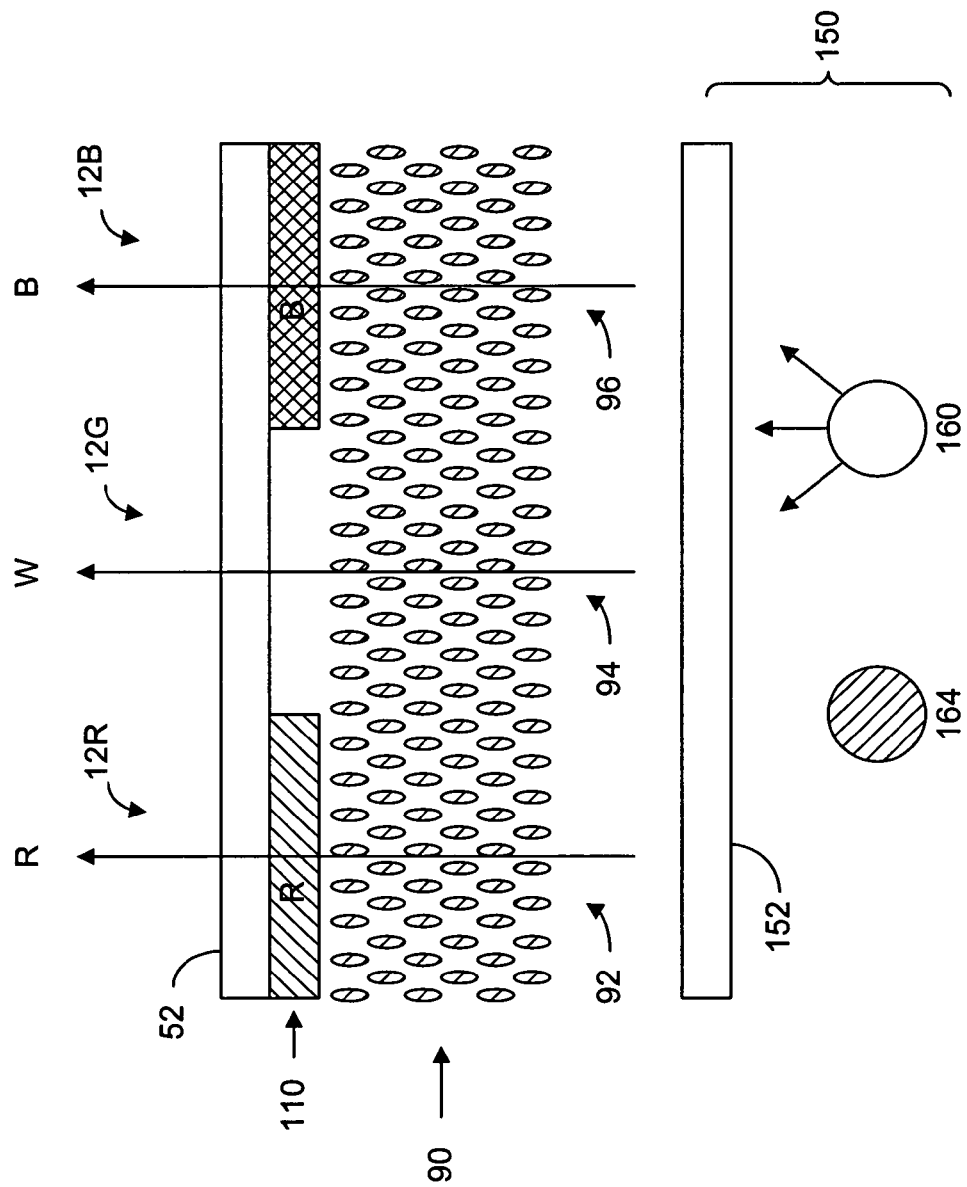
FIG. 4a shows a color pixel during one frame time, according one embodiment of the present invention.

FIGS. 4a to 5b illustrates different embodiments of the present invention. For simplicity, only three layers in a pixel are shown: the upper substrate 52, the color filter 110 and the liquid crystal layer 90. The color filter 110 has a red color filter segment R in the color sub-pixel 12R and a blue color filter segment B in the color sub-pixel 12B. There is no green filter in the color sub-pixel 12G. The backlight source 150, as schematically shown in FIGS. 4a and 4b, comprises a plurality of light producing components 164 and 160 which can be separately and independently turned on and off. The light produced by the light producing components can be directed toward the liquid crystal display panel by an optical component 152. The light producing components 164 can be an array of green light-emitting diodes (LEDs), for example. The light producing components 160 can be an array of white light-emitting diodes, for example. Each of the light producing components 160 can be a single white light-emitting diode or a group of RGB light-emitting diodes. The liquid crystal layer 90 comprises a liquid crystal layer segment 92 associated with the color sub-pixel 12R, a liquid crystal layer segment 94 associated with the color sub-pixel 12G, and a liquid crystal layer segment 96 associated with the color sub-pixel 12B. Since each of the color sub-pixels 12R, 12G and 12B has a separate sub-pixel electrode (sub-pixel electrodes 62, 64 and 66, see FIG. 3), each of the liquid crystal layer segments 92, 94 and 96 can be separately controlled by the voltage potential between the associated sub-pixel electrode and the common electrode (FIG. 3). The voltage potential across the liquid crystal layer is controlled and determined by the signals in the gate line and the data line, and other electronic components in a pixel.

In general, a liquid crystal layer can be operated in a first state and in a second state. Depending upon the chemical characteristics of the liquid crystal layer, the liquid crystal molecules in the layer can be aligned along a certain direction in response to the voltage potential. In some liquid crystal materials, the liquid crystal molecules can be caused to align along a direction substantially perpendicular to the substrate. As such, light from the backlight source 150 can be sufficiently transmitted through the liquid crystal layer 90 as part of the light beam is absorbed by the liquid crystal layer. For simplicity, the liquid crystal layer is said to be in a light non-blocking state (the first state). As shown in FIG. 4a, all three liquid crystal layer segments 92, 94 and 96 are operated in the first state or the light non-blocking state. According to one embodiment of the present invention, the green light producing components 164 are turned off and the white light producing components 160 are turned on. When white the light beam from the backlight source 150 passes through the color sub-pixel 12R, it appears red after being filtered by the red (R) filter. When the white light beam passes through the color sub-pixel 12G, it appears white because it is not filtered by a color filter. When the white light beam passes through the color sub-pixel 12B, it appears blue after being filtered by the blue (B) filter in the color filter 110.

Figure 4B:
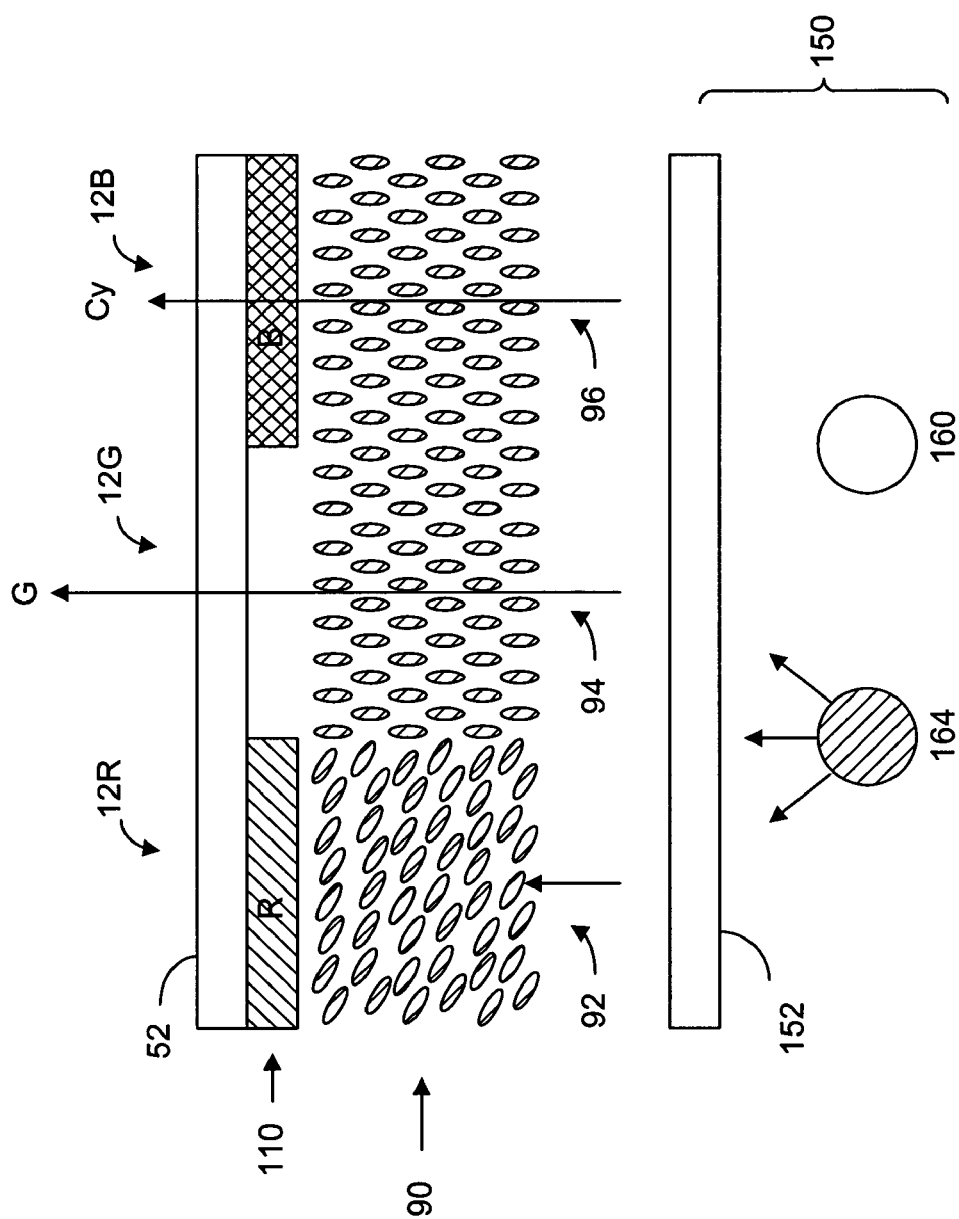
FIG. 4b shows the same color pixel during a next frame time.

As shown in FIG. 4b, the white light producing components 160 are turned off and the green light producing components 164 are turned on. While the liquid crystal layer segments 94 and 96 are operated in the light non-blocking state (first state), the liquid crystal layer segment 92 is operated in a light blocking state (second state). When the green light beam from the backlight source 150 passes through the color sub-pixel 12R, it is effectively blocked by the red filter. When the green light beam passes through the color sub-pixel 12G, it appears green because it is not filtered by a color filter. When the green light beam passes through the color sub-pixel 12B, it appears cyan (Cy) after being filtered by the blue filter in the color filter 110.

Figure 5C:
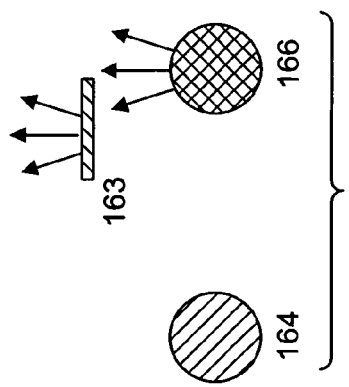
FIG. 5c shows a purple light emitting component.
Figure 5A:
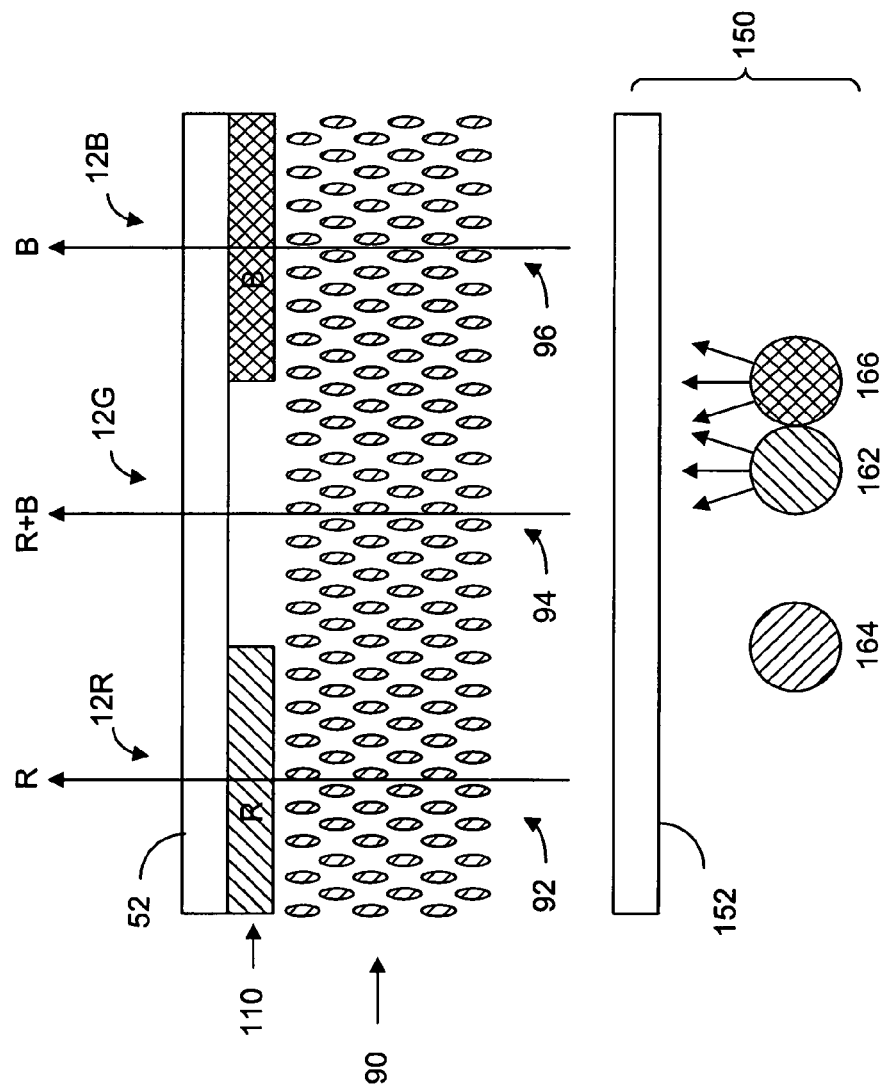
FIG. 5a shows a color pixel during one frame time, according another embodiment of the present invention.
Figure 5B:
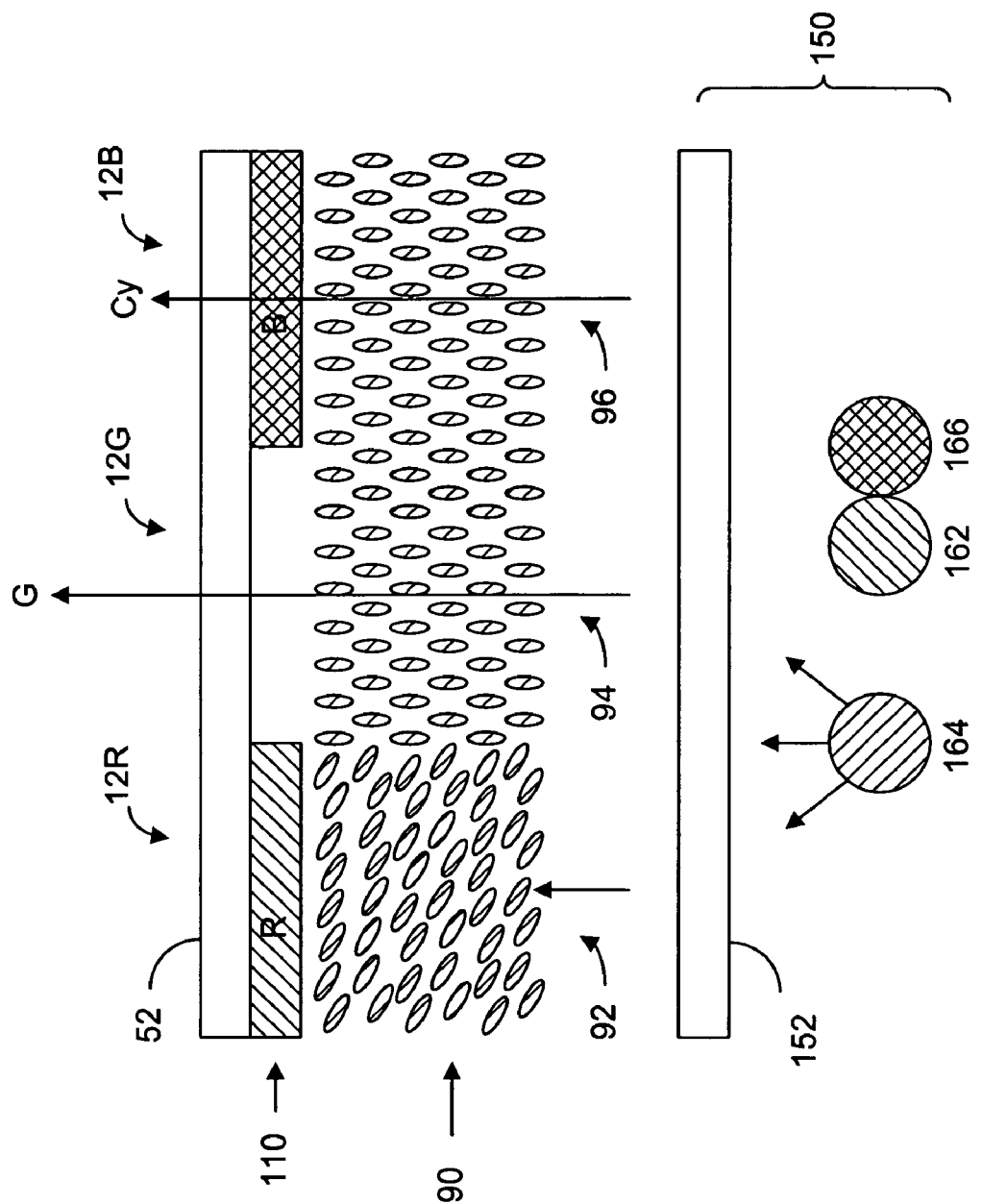
FIG. 5b shows the same color pixel during a next frame time.

In a different embodiment of the present invention, the white light producing components 160 in the backlight source 150 are replaced by a plurality of red and blue light producing components 162 and 166, as shown in FIGS. 5a and 5b. When all three liquid crystal layer segments 92, 94 and 96 are operated in the first state or the light non-blocking state, as shown in FIG. 5a, the green light producing components 164 are turned off and the red/blue light producing components 162 and 166 are turned on. When the red/blue light beam from the backlight source 150 passes through the color sub-pixel 12R, it appears red after being filtered by the red filter. When the red/blue light beam passes through the color sub-pixel 12G, it appears purple because it is not filtered by a color filter. When the red/blue light beam passes through the color sub-pixel 12B, it appears blue after being filtered by the blue filter in the color filter 110.

As shown in FIG. 5b, the red/blue light producing components 162 and 166 are turned off and the green light producing components 164 are turned on. While the liquid crystal layer segments 94 and 96 are operated in the light non-blocking state (first state), the liquid crystal layer segment 92 is operated in a light blocking state (second state). When the green light beam from the backlight source 150 passes through the color sub-pixel 12R, it is effectively blocked by the red filter. When the green light beam passes through the color sub-pixel 12G, it appears green because it is not filtered by a color filter. When the green light beam passes through the color sub-pixel 12B, it appears cyan after being filtered by the blue filter in the color filter 110.

According to another embodiment of the present invention, the red components 162 can be replaced by fluorescent/phosphorescent materials 163 which can be excited by the blue light producing components 166 to produce red light, as shown in FIG. 5c.

Figure 6:
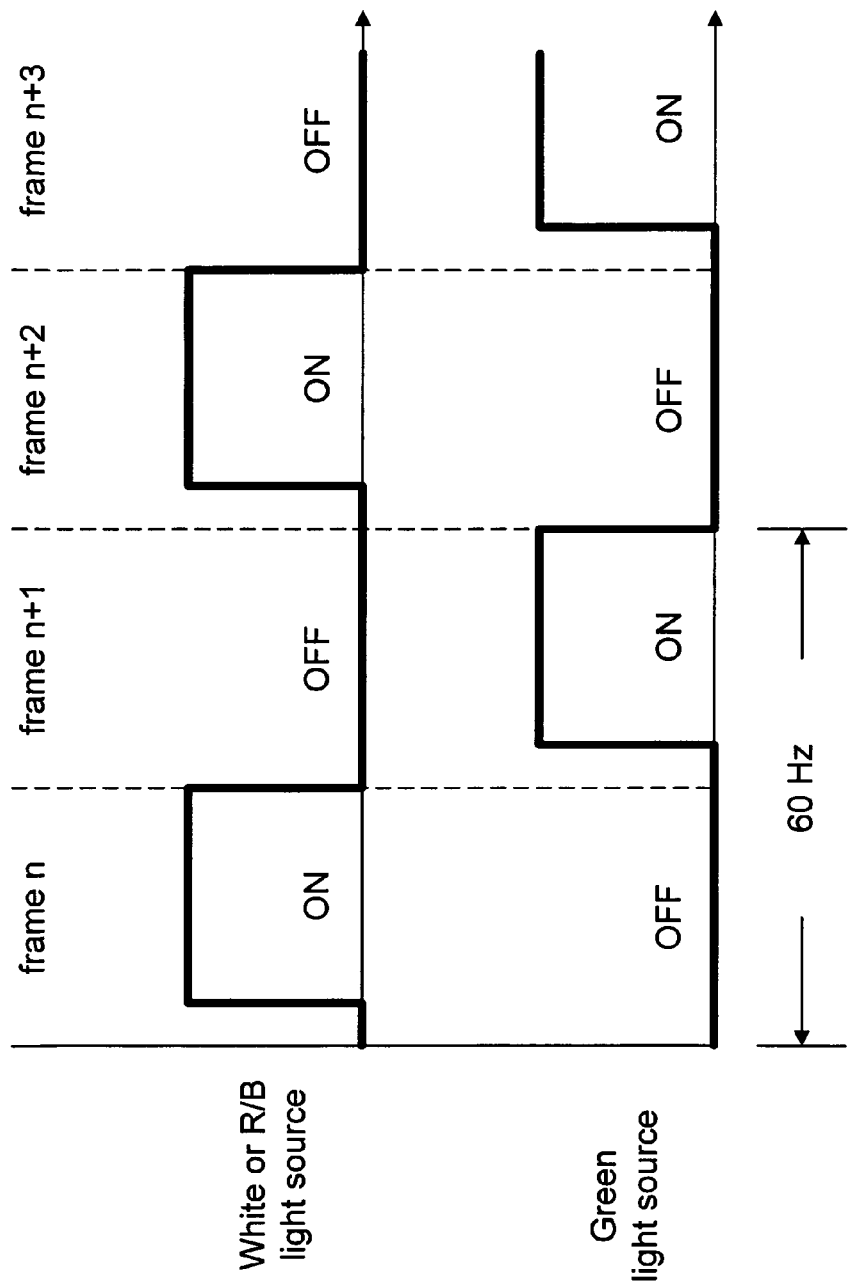
FIG. 6 shows the color control of the backlight source in different frame cycles.
Figure 7:
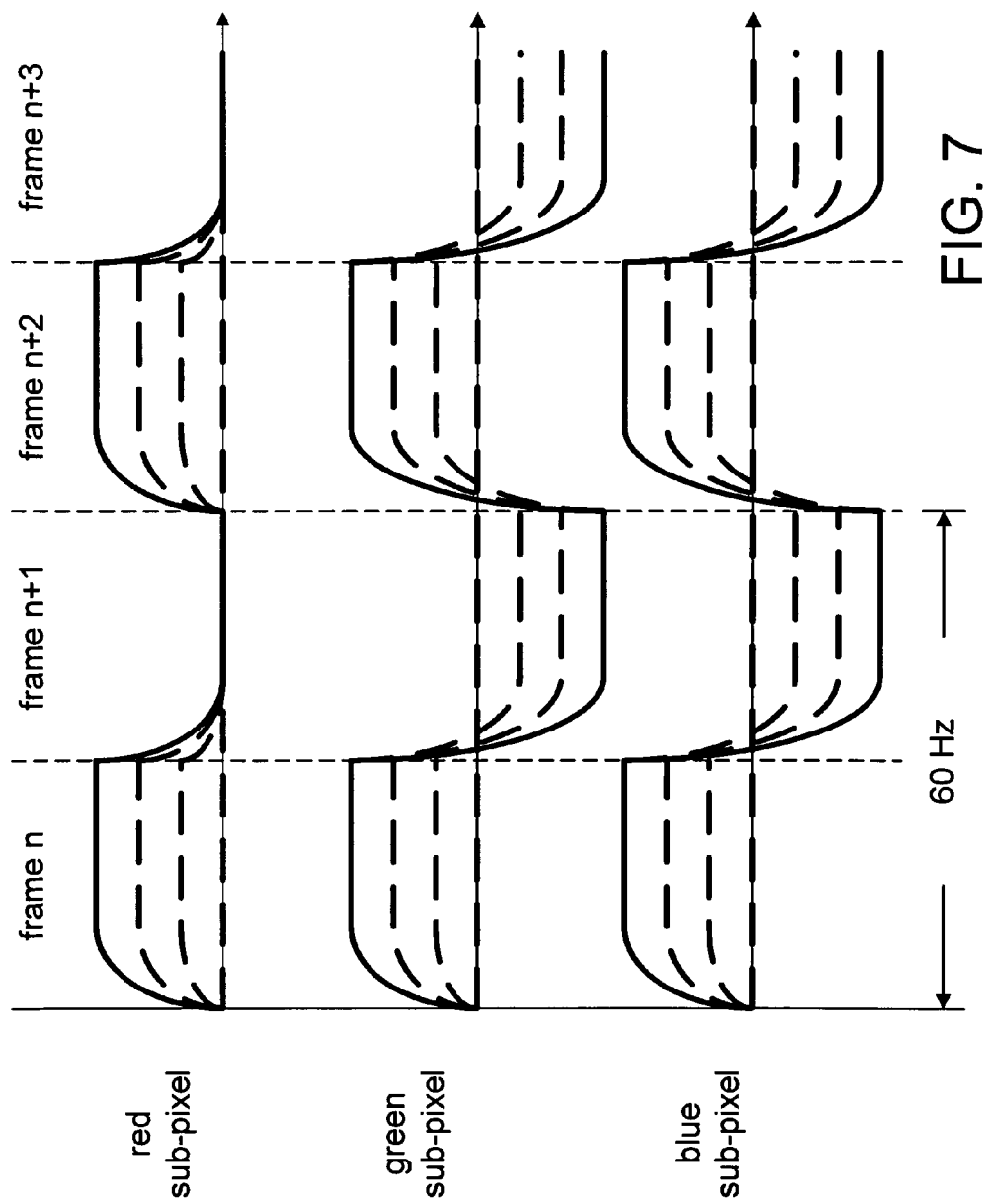
FIG. 7 shows the voltage potentials across the liquid crystal layer in the sub-pixels in different frame cycles.

According to different embodiments of the present invention, the switching of the light producing components in the backlight source 150 is carried out alternately in consecutive frames, as shown in FIG. 6. The on/off switching cycle is carried out in a 60 Hz frequency or a higher frequency. Likewise, the liquid crystal layer segment 92 in the color sub-pixel 12R is alternately operated in the first state and in the second state in consecutive frames. As shown in FIG. 7, all the red, green and blue sub-pixels (12R, 12G and 12B in FIGS. 4a-5b) are turned on in frames n, n+2, n+4 and so forth by the gate line signal. In frames n+1, n+3 and so forth, while the green and blue sub-pixels are turned on, the red sub-pixel is not turned on. FIG. 7 shows the voltage potentials across the liquid crystal layer segments in the color sub-pixels in different frame periods. It should be noted that, even when a color sub-pixel is turned on by a gate line signal, for example, the voltage potential across the liquid crystal layer segment is also determined by the signal in the data line. For example, the brightness of the green light as seen through the green color sub-pixel can be higher in one frame and lower in another, depending on the voltage potential in a particular frame. Likewise, the brightness of the blue light as seen through the blue color sub-pixel can be higher in one frame and higher in another. The brightness of the red light as seen through the red color sub-pixel, however, is effectively zero in frames n+1, n+3 and so on. Thus, when the liquid crystal layer segment is operated in the second state, it effectively prevents light from passing through the layer and the layer segment is said to be light blocking. When the liquid crystal layer segment is operated in the first state or the light non-blocking state, it generally allows some light to pass through the layer, but it may also prevent light from passing through, depending on the signal of the data line.

In sum, the present invention provides a color liquid-crystal display panel with red sub-pixels, green sub-pixels and blue sub-pixels. While the color filter layer in a pixel has a red filter segment in the red sub-pixel and a blue filter segment in the blue sub-pixel, there is no green filter segment in the green sub-pixel. The backlight source for illuminating the color crystal display panel has a plurality of green light producing components alternately switched on and off in consecutive frames. The backlight source also has a plurality of white light producing components, according to one embodiment, or a plurality of red/blue light producing components, according to another embodiment, or a purple light emitting components, according to yet another embodiment of the present invention. The purple light emitting components may comprise a plurality of blue light emitting diodes and fluorescent/phosphorescent materials that produce red light under the excitation by the blue light. The white or red/blue or purple light emitting components are alternately switched on and off in consecutive frames in a complementary phase as compared to the switching cycle of the green light producing components. When the liquid crystal layer segments associated with all the three color sub-pixels are operated in a light non-blocking state (a first state), the white or red/blue light producing components are turned on, and the green light producing components are turned off. When the liquid crystal layer segments associated with the red sub-pixels are operated in a light blocking state (a second state), the green light producing components are turned on, and the white or red/blue light producing components are turned off. Thus, the liquid crystal layer segments associated with the green and blue color sub-pixels are operated in the first state in all frames, but the liquid crystal layer segments associated with red sub-pixels are alternately operated in the first state and in the second state.

Thus, the color liquid-crystal display, according to various embodiments of the present invention, comprises a plurality of pixels, at least some of the pixels comprising color sub-pixels, the color sub-pixels comprising first sub-pixels, second sub-pixels and third sub-pixels. The liquid-crystal display further comprises:

a color filter comprising a red filter segment configured for color filtering in each first sub-pixel, and a blue filter segment configured for color filtering in each third sub-pixel;

a liquid crystal layer comprising a plurality of liquid crystal layer segments associated with the color sub-pixels, each liquid crystal layer segment operable in a first state and in a second state; and a backlight source for illuminating the liquid-crystal display through the liquid crystal layer and the color filter, said backlight source comprising a plurality of first light source components and a plurality of second light source components different from the first light source components, such that when the liquid crystal layer segments associated with the first sub-pixels, the second sub-pixels and the third sub-pixels are operated in the first state, the first light source components are turned on for said illuminating; and when the liquid crystal layer segments associated with the second sub-pixels and the third sub-pixels are operated in the first state, and the liquid crystal layer segments associated with the first sub-pixels are operated in the second state, the second light source components are turned on for said illuminating. Thus, the first sub-pixels are alternately operated in the first state and in the second state in consecutive frames in a predetermined frequency greater than or substantially equal to 60 Hz, and wherein the first light source components and the second light source components are alternately turned on for said illuminating in said predetermined frequency.

According to one embodiment of the present invention, the first light source components comprise white light emitting components, such as white light emitting diodes or combined red/blue/green light emitting diodes, and the second light source components comprise green emitting components, such as green light emitting diodes.

According to another embodiment of the present invention, the first light source components comprise red and blue light emitting components, or purple light emitting components.

In one embodiment of the present invention, the liquid crystal layer comprises a plurality of liquid crystal molecules operable in a light blocking state and a light non-blocking state, and when the liquid crystal layer segments are operated in the first state, the liquid crystal molecules are operated in the light non-blocking state, and when the liquid crystal layer segments are operated in the second state, the liquid crystal molecules are operated in the light-blocking state. In particular, when the liquid crystal molecules are operated in the light non-blocking state, the liquid crystal molecules are caused to align along an axis substantially perpendicular to the liquid crystal layer.

The present invention also provides a method for operating a liquid crystal display panel and a backlight source, wherein the liquid crystal display panel comprises a liquid crystal layer, a color filter, and a plurality of first sub-pixels, second sub-pixels and third sub-pixels, and wherein the liquid layer comprises a plurality of liquid crystal layer segments associated with the color sub-pixels, each liquid crystal layer segment operable in a first state and in a second state, and wherein the backlight source is arranged for illuminating the liquid-crystal display through the liquid crystal layer and the color filter, the backlight source comprising a plurality of first light source components and a plurality of second light source components different from the first light source components, said method comprising:

arranging in the color filter a red filter segment for color filtering each first sub-pixel and a blue filter for color filtering each third sub-pixel;

operating the backlight source such that when the liquid crystal layer segments associated with the first sub-pixels, the second sub-pixels and the third sub-pixels are operated in the first state, the first light source components are turned on for said illuminating; and when the liquid crystal layer segments associated with the second sub-pixels and the third sub-pixels are operated in the first state, and the liquid crystal layer segments associated with the first sub-pixels are operated in the second state, the second light source components are turned on for said illuminating.

The present invention also provides a backlight source configured for illuminating a color liquid-crystal display, wherein the liquid crystal display panel comprises a liquid crystal layer, a color filter, and a plurality of color sub-pixels, wherein the color sub-pixels comprise first sub-pixels, second sub-pixels and third sub-pixels, and wherein the liquid layer comprises a plurality of liquid crystal layer segments associated with the color sub-pixels, each liquid crystal layer segment operable in a first state and in a second state, and wherein the color filter comprising a red filter segment configured for color filtering in each first sub-pixel, and a blue filter segment configured for color filtering in each third sub-pixel. The backlight source comprises:

a plurality of first light source components; and a plurality of second light source components different from the first light source components, wherein the first light source components are configured to be turned on for said illuminating only when the liquid crystal layer segments associated with the first sub-pixels, the second sub-pixels and the third sub-pixels are operated in the first state, and the second light source components are configured to be turned on for said illuminating only when the liquid crystal layer segments associated with the second sub-pixels and the third sub-pixels are operated in the first state, and the liquid crystal layer segments associated with the first sub-pixels are operated in the second state.

It should be noted that the light emitting components in the backlight source have been described as light emitting diodes. However, other light sources, such as lasers, can also be used.

Thus, although the present invention has been described with respect to one or more embodiments thereof, it will be understood by those skilled in the art that the foregoing and various other changes, omissions and deviations in the form and detail thereof may be made without departing from the scope of this invention.

What is claimed is:

1. A color liquid-crystal display comprising a plurality of pixels, at least some of the pixels comprising color sub-pixels, the color sub-pixels comprising first sub-pixels, second sub-pixels and third sub-pixels, said liquid-crystal display further comprising:
   a color filter comprising a red filter segment configured for color filtering in each first sub-pixel, and a blue filter segment configured for color filtering in each third sub-pixel;
   a liquid crystal layer comprising a plurality of liquid crystal layer segments associated with the color sub-pixels, each liquid crystal layer segment operable in a first state and in a second state; and
   a backlight source for illuminating the liquid-crystal display through the liquid crystal layer and the color filter, said backlight source comprising a plurality of first light source components and a plurality of second light source components different from the first light source components, such that when the liquid crystal layer segments associated with the first sub-pixels, the second sub-pixels and the third sub-pixels are operated in the first state, the first light source components are turned on for said illuminating; and
   when the liquid crystal layer segments associated with the second sub-pixels and the third sub-pixels are operated in the first state, and the liquid crystal layer segments associated with the first sub-pixels are operated in the second state, the second light source components are turned on for said illuminating.

2. The display of claim 1, wherein the first light source components comprise white light emitting components, and the second light source components comprise green emitting components.

3. The display of claim 1, wherein the first light source components comprise red light emitting components and blue light emitting components, and the second light source components comprise green light emitting components.

4. The display of claim 1, wherein the first light source components comprise blue light emitting components to produce blue light and materials excitable by the blue light for producing red light, and the second light source components comprise green light emitting components.

5. The display of claim 1, wherein the first sub-pixels are alternately operated in the first state and in the second state in consecutive frames in a predetermined frequency greater than or substantially equal to 60 Hz, and wherein the first light source components and the second light source components are alternately turned on for said illuminating in said predetermined frequency.

6. The display of claim 1, wherein light from the second light source is partially blocked by the blue filter when the third sub-pixels are operated in the first state.

7. The display of claim 1, wherein the liquid crystal layer comprises a plurality of liquid crystal molecules operable in a light blocking state and a light non-blocking state, and when the liquid crystal layer segments are operated in the first state, the liquid crystal molecules are operated in the light non-blocking state, and when the liquid crystal layer segments are operated in the second state, the liquid crystal molecules are operated in the light-blocking state.

8. The display of claim 1, wherein when the liquid crystal molecules are operated in the light non-blocking state, the liquid crystal molecules are caused to align along an axis substantially perpendicular to the liquid crystal layer.

9. A method for operating a liquid crystal display panel and a backlight source, the liquid crystal display panel comprising:
   a liquid crystal layer,
   a color filter, and
   a plurality of pixels, at least some of the pixels comprising color sub-pixels, wherein the color sub-pixels comprise first sub-pixels, second sub-pixels and third sub-pixels, and wherein the liquid layer comprises a plurality of liquid crystal layer segments associated with the color sub-pixels, each liquid crystal layer segment operable in a first state and in a second state, and wherein the backlight source is arranged for illuminating the liquid-crystal display through the liquid crystal layer and the color filter, the backlight source comprising a plurality of first light source components and a plurality of second light source components different from the first light source components, said method comprising:
   arranging in the color filter a red filter segment for color filtering each first sub-pixel and a blue filter for color filtering each third sub-pixel;
   operating the backlight source such that
   when the liquid crystal layer segments associated with the first sub-pixels, the second sub-pixels and the third sub-pixels are operated in the first state, the first light source components are turned on for said illuminating; and
   when the liquid crystal layer segments associated with the second sub-pixels and the third sub-pixels are operated in the first state, and the liquid crystal layer segments associated with the first sub-pixels are operated in the second state, the second light source components are turned on for said illuminating.

10. The method of claim 9, wherein the first light source components comprise white light emitting components, and the second light source components comprise green emitting components.

11. The method of claim 9, wherein the first light source components comprise red light emitting components and blue light emitting components, and the second light source components comprise green light emitting components.

12. The method of claim 9, wherein the first light source components comprise blue light emitting components to produce blue light and materials excitable by the blue light for producing red light, and the second light source components comprise green light emitting components.

13. The method of claim 9, wherein the first sub-pixels are alternately operated in the first state and in the second state in consecutive frames in a predetermined frequency greater than or substantially equal to 60 Hz, and wherein the first light source components and the second light source components are alternately turned on for said illuminating in said predetermined frequency.

14. The method of claim 9, wherein the liquid crystal layer comprises a plurality of liquid crystal molecules operable in a light blocking state and a light non-blocking state, and when the liquid crystal layer segments are operated in the first state, the liquid crystal molecules are operated in the light non-blocking state, and when the liquid crystal layer segments are operated in the second state, the liquid crystal molecules are operated in the light-blocking state.

15. The method of claim 14, wherein when the liquid crystal molecules are operated in the light non-blocking state, the liquid crystal molecules are caused to align along an axis substantially perpendicular to the liquid crystal layer.

16. A backlight source configured for illuminating a color liquid-crystal display, the liquid crystal display panel comprising:
a liquid crystal layer,
a color filter, and
a plurality of pixels, at least some of the pixels comprising color sub-pixels, wherein the color sub-pixels comprise first sub-pixels, second sub-pixels and third sub-pixels, and wherein the liquid layer comprises a plurality of liquid crystal layer segments associated with the color sub-pixels, each liquid crystal layer segment operable in a first state and in a second state, and wherein the color filter comprising a red filter segment configured for color filtering in each first sub-pixel, and a blue filter segment configured for color filtering in each third sub-pixel, said backlight source comprising:
a plurality of first light source components; and
a plurality of second light source components different from the first light source components, wherein the first light source components are configured to be turned on for said illuminating only when the liquid crystal layer segments associated with the first sub-pixels, the second sub-pixels and the third sub-pixels are operated in the first state, and the second light source components are configured to be turned on for said illuminating only when the liquid crystal layer segments associated with the second sub-pixels and the third sub-pixels are operated in the first state, and the liquid crystal layer segments associated with the first sub-pixels are operated in the second state.

17. The backlight source of claim 16, wherein the first light source components comprise white light emitting components, and the second light source components comprise green emitting components.

18. The backlight source of claim 17, wherein the white light emitting components comprise white light emitting diodes and the green emitting components comprise green emitting diodes.

19. The backlight source of claim 17, wherein the white light emitting components comprise red light emitting diodes, green light emitting diodes and blue light emitting diodes, and the green emitting components comprise green emitting diodes.

20. The backlight source of claim 16, wherein the first light source components comprise red light emitting components and blue light emitting components, and the second light source components comprise green light emitting components.

21. The backlight source of claim 20, wherein the red light emitting components comprise red light emitting diodes, the blue light emitting components comprise blue light emitting diodes, and the green emitting components comprise green emitting diodes.

22. The backlight source of claim 16, wherein the first light source components comprise purple light emitting components, and the second light source components comprise green light emitting components.

23. The backlight source of claim 22, wherein the purple light emitting components comprises blue light emitting components to produce blue light and material excitable by the blue light for producing red light.

24. The backlight source of claim 16, wherein the first sub-pixels are alternately operated in the first state and in the second state in consecutive frames in a predetermined frequency greater than or substantially equal to 60 Hz, and wherein the first light source components and the second light source components are alternately turned on for said illuminating in said predetermined frequency.

25. The display of claim 1, wherein the color filter further comprises a clear segment on each second sub-pixel.

26. The method of claim 9, wherein the first light source components and the second light source components are alternately turned on in consecutive frames for an equal period in a frame for said illuminating.

* * * * *